United States Patent [19]

Herzig

[11] 4,013,826

[45] Mar. 22, 1977

[54] HIGH-VOLTAGE OVERHEAD TRANSMISSION LINE WITH UNIQUELY STRESSED ELEMENTS

[75] Inventor: Karl-Heinz Herzig, Viernheim, Germany

[73] Assignee: BBC Brown, Boveri & Cie, Mannheim, Germany

[22] Filed: July 9, 1975

[21] Appl. No.: 594,353

[30] Foreign Application Priority Data

July 9, 1974 Germany .......................... 2432849

[52] U.S. Cl. .................................... 174/43; 52/148; 191/41

[51] Int. Cl.$^2$ ...................... H02G 7/00; H02G 7/22

[58] Field of Search ................. 174/40 R, 43, 45 R; 191/40, 41; 52/40, 146, 148, 152, 299; 104/125

[56] References Cited

UNITED STATES PATENTS 3,159,709 12/1964 Austin et al. .................... 174/45 R

FOREIGN PATENTS OR APPLICATIONS 517,627 12/1920 France ................................ 174/43

1,011,291 4/1952 France ............................ 174/45 R 755,491 8/1956 United Kingdom ................ 174/43

*Primary Examiner*—Laramie E. Askin

*Attorney, Agent, or Firm*—Oblon, Fisher, Spivak, McClelland & Maier

[57] ABSTRACT

A high-voltage overhead transmission line with masts, insulator chains and conductor cables attached to high-strength guy lines and with ground wires is disclosed comprising a plurality of guyed masts with thrust footings forming support positions each with at least two support points in a plane normal to the conductor cables. Each guy line passes over at least two support points and is anchored to the ground at its ends. The guyed masts of each support position and the guy wires in the rigging field are tied together in an approximately horizontal plane by catenary-arranged insulators. The conductor cables are suspended from the network thus formed.

4 Claims, 4 Drawing Figures

HIGH-VOLTAGE OVERHEAD TRANSMISSION LINE WITH UNIQUELY STRESSED ELEMENTS

BACKGROUND OF THE INVENTION

1. Field of the Invention:

The invention concerns a high-voltage overhead transmission line with masts, insulator chains, and high-strength guy wires holding the conductor cables and the ground wires. It is of use in solving the problem of economically transmitting ever-increasing amounts of electrical energy with overhead lines etc., and to thereby on the one hand transmit the voltage and on the other hand fit the line optimally into the landscape.

2. Description of the Prior Art:

It is known that for reduction of mechanical stress of the conductor cable and to enable optimal design for electrical transmission, a messenger cable can be suspended on a steel cable (German Patent No. 714,526), a conductor cable on a steel cable (German Patent No. 2,106,881) or conductor cables on plastic cables of high tensile strength, e.g., of tensilized plastics, so-called monofilaments (German Patent Nos. 2,129,843 and 2,143,134).

Other overhead line constructions are known which depart from the conventional thought that the mast must absorb the vertical and diagonal forces exerted by the conductors. In the prior art, so-called two-dimensional configuration plastic elements are permitted to replace conventional insulator chains and parts of the steel framework, (Elektrizitatswistschaft, vol. 69 (1970), no. 19, pp. 514–520). A simple insulator design is a movable cross arm consisting of one insulator part in tension and one in compression and is used to replace the traditional cross arm with V-shaped insulator chains.

Another cross arm construction is known in which compressive forces are completely avoided (Elektrizitatswirtschaft, vol. 72 (1973), no. 22, pp. 775–779). This is achieved by use of a link polygon in which only tensile forces can arise. The sections of the polygon between "corners" consist of plastic rod-type insulators. The known plastic cross arms can also be used for multiple lines. They are situated in this case, for example, between guyed masts slanting away from one another in the vertical plane normal to the line direction. The conductors are suspended on insulators from the plastic cross arms. Because of the loading, particularly in the line direction, torques act on the masts, at least on parts of the masts.

SUMMARY OF THE INVENTION

It is a goal of the invention to create a high-voltage overhead line having a configuration of strong elements each subjected only to tension or to compression.

The foregoing and other objects are attained in accordance with one aspect of the present invention through the provision of positions of support with at least two support points in a plane normal to the conductor cables in the form of guyed masts with thrust footings, each guy wire running to at least two masts and being anchored to the ground at its ends, by tying together the guyed masts of each supporting position and the guy wires in the overhead rigging in horizontal planes with catenary-arranged insulator chains and by suspending the conductor cables from the network thus formed.

The invention advantageously permits an optimal design of the overhead line with respect to the arrangement of the conductor cables, the span width and the conductor-cable sag.

The construction of the high-voltage overhead line is simple and the forces arising may be easily controlled since the guy wires in the extreme case can each be anchored in the ground right after passage through two support points.

The support points or guyed masts are stayed in at least two directions, usually in four directions, with anchor cables in order to absorb wind forces. The wind forces likewise are directed into the ground by way of traction footings. So-called screw anchors can be used. This application is known (German Designs Patent Nos. 1,896,487 and 1,853,597).

The conductor cables are suspended with the least possible tensile stress from the insulator chains in the network formed by the guy wires and the catenary-, i.e., string-or chain-like arranged insulator chains. The sag in the conductor cables is kept small by choosing the distances between pairs of connection or suspension points to be small enough. The clamps at the connection or suspension points are so formed that they can absorb the low tensile forces of the conductor cables; thus the guys of the classical construction method are completely eliminated.

Because of the small sag in the highly stressed guy wires and the associated possibly much greater span width than before, there is the further advantage of better utilization of the land. In particular, the parameters "mast volume" and "mast area on the ground" defined in Elektrizitatswistschaft, vol. 69 (1970), no. 19, p. 515 are reduced.

The rigging of the guys wires between the support points in the form of a network keeps down the swaying of the guy wires and thereby of the conductor cables also. That means that the area covered by the high-voltage overhead transmission line is minimized.

The arrangement of the conductor cables between the support points and the relatively firm restraint of the conductor cables achieved permit the smallest separation of the conductor cables to be obtained and thus also an electrically optimal configuration of the overhead transmission line.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF A PREFERRED EMBODIMENT

Figure 1:
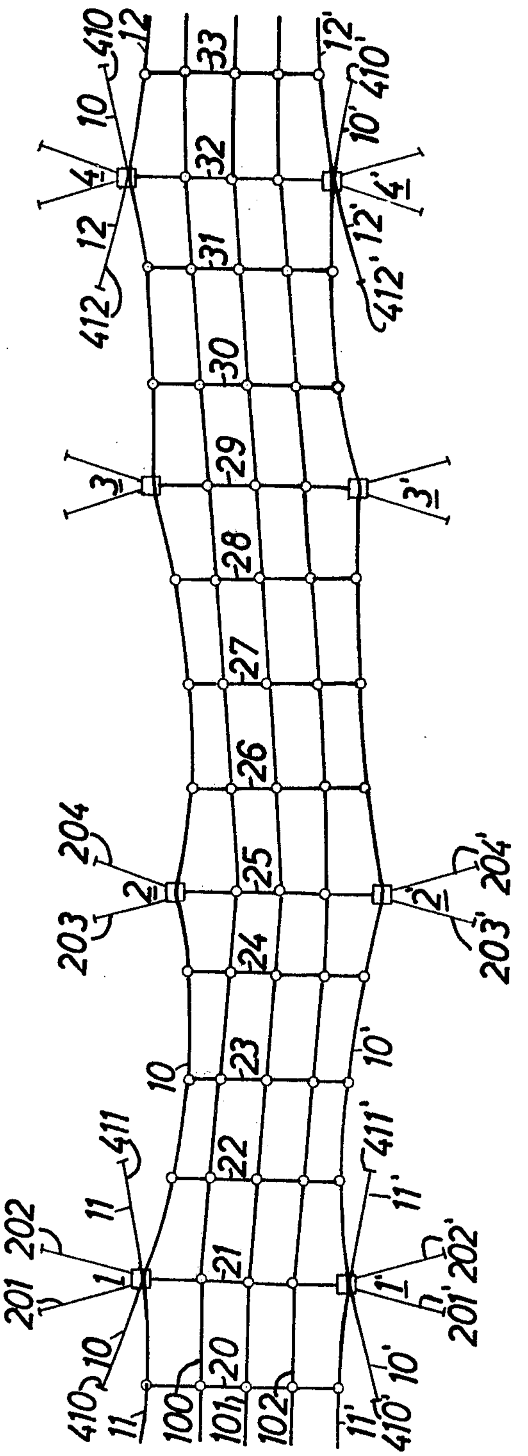
FIG. 1 is a schematic plan view of a high-voltage overhead transmission line.

Referring now to the drawings, wherein like reference numerals designate identical or corresponding parts throughout the several views, and more particularly to FIG. 1 thereof, the high-voltage line consists of support positions and support points 1, 1', 2, 2', 3, 3', 4, 4' as pure compression elements with thrust foundations. These support points can be constructed by known techniques such as lattice-mast construction, tubular construction, etc. The high-voltage line consists further of guy wires 10 to 14 and 10' to 14' (FIG. 3), catenary -suspended insulators 20 to 33, conductor cables 100, 101 and 102, ground wires 106 and 107 (FIG. 3), guy anchors 201 to 204 and 201' to 204' for the support points and traction footings 410, 411, 412, and 410', 411', 412' for the guy wires.

Figure 2:
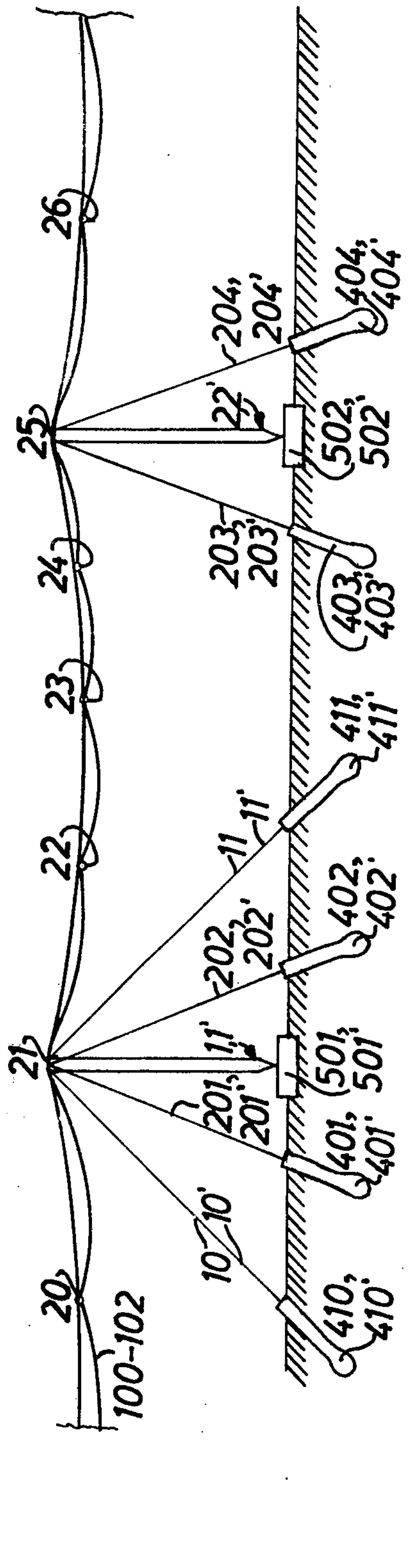
FIG. 2 is a side view of a rigging field.

FIG. 2 shows a side view of a rigging field with a support point, 1, 1' at which the guy wires 10, 10' and 11, 11' are anchored and a support point 2, 2' over which the guy wire 10, 10' passes. Also shown are the traction footings of the guy anchors 201 to 204 and 201' to 204' with the numbers 401, 401' – 404, 404'. Further, the thrust footings of the supports are denoted by the numbers 501, 501' and 502, 502'. It is to be emphasized that the guy lines 10, 10' and 11, 11' are anchored directly to the ground by means of the anchoring rods 410, 410' and 411, 411' respectively.

Figure 3:
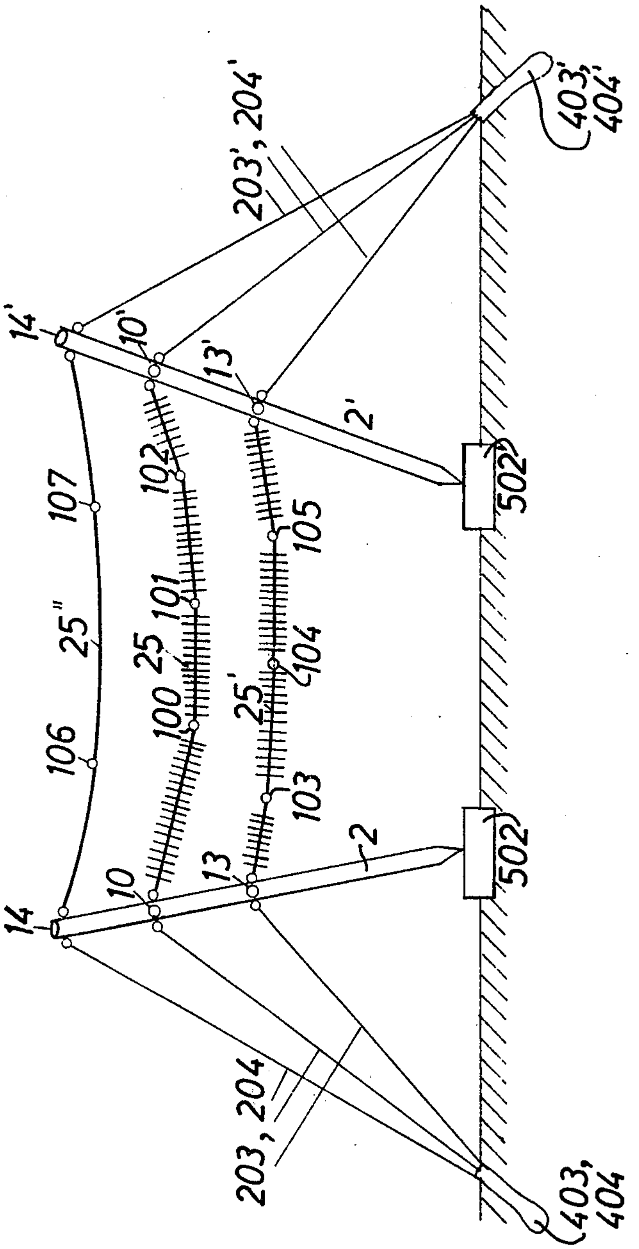
FIG. 3 is a section through a high-voltage overhead transmission line at a support position for the example of a double line with two circuits and two ground wires.

FIG. 3 shows a section through the high-voltage overhead transmission line at the support position with the support points 2, 2' for the example of a double line with three circuits and two ground wires. The line is equipped with six guy wires 10, 10', 13, 13', 14 and 14', i.e., two guy lines for each conductor cable or ground wire plane. The guy lines 14, 14' pull on the two ground wires 106 and 107 at the cross connection 25''. The first conductor cable plane is supported by the guy wires 10, 10' and consists of the conductor cables 100, 101 and 102 and the catenary insulator chain 25. The second conductor cable plane is supported by the guy lines 13, 13' and consists of the conductor cables 103, 104 and 105 and the catenary insulator chain 25'. The catenary insulator chains in the rigging fields, e.g., 24, 26, 27, etc., support the conductor cables in a manner similar to that shown in FIG. 3. However, the insulators are attached directly to the guy wires 10 and 10' or 13 and 13'. The same holds true for the ground wire plane.

Figure 4:
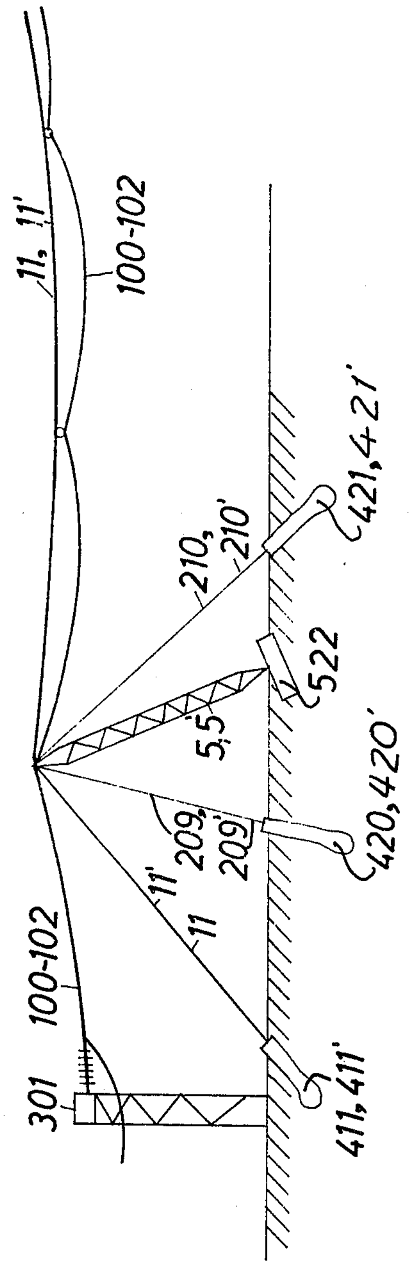
FIG. 4 is a terminus of a high-voltage overhead transmission line.

FIG. 4 shows an example of a terminus of a high-voltage overhead transmission line. In this example, the guy wire 11, 11' is anchored with the traction footings 411, 411' and supported by the end mast 5, 5'. Also shown is a thrust footing 522 for the end mast 5, 5' and traction footings 420, 420' and 421, 421' for the guy anchors 209, 209' and 210, 210'. This mast is advantageously placed at the bisector of the forces from the guy lines. The conductor cables 100–102 are led to the terminal structure 301 and are anchored there, if required, in the classical manner to absorb the remaining tensile forces in the conductor cable.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. High-voltage overhead transmission line with masts, insulator chains and conductor cables attached to high-strength guy lines and with ground wires comprising:

a plurality of guyed masts with thrust footings forming support positions each with at least two support points in a plane normal to the conductor cables, each guy line passing over at least two support points and being anchored to the ground at its ends, the guyed masts of each support position and the guy lines in a rigging field being tied together in an approximately horizontal plane by catenary-arranged insulators, the conductor cables being suspended from the network thus formed.

2. High-voltage overhead transmission line as in claim 1 wherein the support points are constructed in different horizontal planes with the ground wires suspended in the highest plane.

3. High-voltage overhead transmission line as in claim 2 wherein masts stayed in four directions with guy anchors serve as guyed masts and the masts of a support position slant away from one another as they ascend from the ground.

4. High-voltage overhead transmission line as in claim 1 wherein masts stayed in four directions with guy anchors serve as guyed masts and the masts of a support position slant away from one another as they ascend from the ground.

* * * * *